Figure 1:
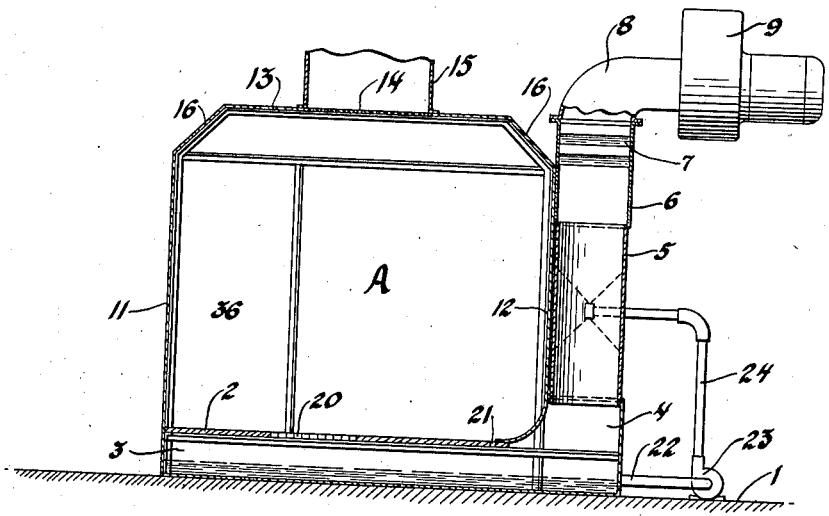

Nov. 2, 1937.　　　　J. E. LUDWIG　　　　2,097,953
SPRAY BOOTH
Filed March 28, 1935

INVENTOR.
John E. Ludwig
BY
ATTORNEY.

Patented Nov. 2, 1937

2,097,953

UNITED STATES PATENT OFFICE 2,097,953

SPRAY BOOTH

John E. Ludwig, Detroit, Mich., assignor to Newcomb David Company, Inc., Detroit, Mich., a corporation of Michigan Application March 28, 1935, Serial No. 13,463

4 Claims. (Cl. 91—60)

This invention relates to spraying booths for installation in buildings where automobile bodies, furniture or other articles are to be sprayed with paint, or the like.

Spray booths per se are not new. Nor is it broadly new to provide some form of air cleaning or conditioning means in spray booths. Various means for cleaning or conditioning air have long been known in other arts, and heretofore various adaptations thereof have been applied to the spray booth art.

It has long been known that water sprayed into a stream of air impregnated with dust or dirt caused most of the particles of dust or dirt to become saturated or heavy and therefore to fall, while the remainder of the air is humidified to a considerable degree,—the air being washed, so to speak.

In spray booths the problem in the past was not primarily one of removing dust from the air, but, on the contrary, it was one of quickly removing poisonous and easily combustible fumes from the vicinity of the workmen and preventing them from coming in contact with any means of igniting the same. There is also a problem of overcoming a great amount of waste which now prevails on account of loss of particles of the substance used for spraying and by reason of the cost of constant cleansing and enforced idleness of the booth during the cleaning operations.

For a long time it has been customary to use synthetic enamel and other expensive paint substances for spraying articles by the use of an air brush operating under a high pressure of approximately 80 lbs. per square inch. Particles of the synthetic enamel or paint are therefore, blown on the floor or on parts of the booth and thus are wasted unless they are properly directed into the air washing means and unless they are separated from the paint-laden air.

In some instances, prior devices have been provided with baffle plates against which the paint-laden air is first directed, (supposedly to cause all the particles of synthetic enamel or paint to be impinged thereagainst, causing said particles to drop into a drip tank) after which the air passes through a thin water spray which serves to absorb and carry off much of the deadly and inflammable fumes. However, many of the particles stick to the baffle plates and are not easily recovered. Moreover, the sprays have not been of the right type to sufficiently separate all the particles of synthetic enamel or paint from the air.

In some types of prior devices, the fume-laden air first passed through a washer where it was merely dampened by a light spray of water and the majority of the particles and synthetic enamel or other material carried by the air was deposited on the eliminator plates, from which they are not easily recovered without damaging them. Hence but small amounts of such particles of enamel or paint were recoverable from the prior types of spray booths.

The recovered particles of synthetic enamel or paint are sent to the refiner where they are easily reclaimed. At the present market value of such recovered particles of synthetic enamel or paint, it is possible by the use of my invention to make a substantial saving on the operation of the spraying department of a plant.

It is therefore an object of this invention to provide means for efficiently separating from the fume-laden air the synthetic enamel or other paint substances which might otherwise be wasted in the spraying operation. To this end, I provide means for directing the fume-laden air downwardly and directly into a water chamber and thence toward the opening of an air washing means wherein I deluge it with water in tubes over a tank, permitting the particles of synthetic enamel or paint to fall into the tank wherein they settle on the botom and from which they are easily recovered, as for instance by means of shoveling.

It is also of considerable economic value to be able to recirculate the water used for washing the air in a spray booth and therefore it has become a common practice to do so. However, in former devices, a plurality of small spraying nozzles have been used, sending a fine spray into the air, which as previously stated, merely dampened air and did not remove all the particles of synthetic enamel or paint therefrom. Thus, as the recirculated water became saturated with such particles, the said nozzles would become clogged. As more of them became clogged, more and more of the delivery water would cease and finally all would cease and the paint-laden air would then carry directly to the eliminator plates and thus would soon cause a clogging of the whole apparatus.

Such clogging not only necessitates and incurs expense for having the parts cleaned out, but causes a loss of production in the interim.

Hence it is another object of this invention to provide a spray booth that does not easily get dirty or clogged and therefore become a great economic asset to a factory engaged in quantity production of parts to be painted.

Other objects of my invention reside in the provision of a spray booth that does not interfere with the rapid passage of conveyors therethrough carrying the objects to be sprayed; that quickly drains off the air impregnated with deadly and dangerous fumes or other impurities; that quickly washes and humidifies the same so that it may be again used in the factory or building when desired to conserve heat; that is simple in construction and is economical both to manufacture and to operate.

Figure 2:
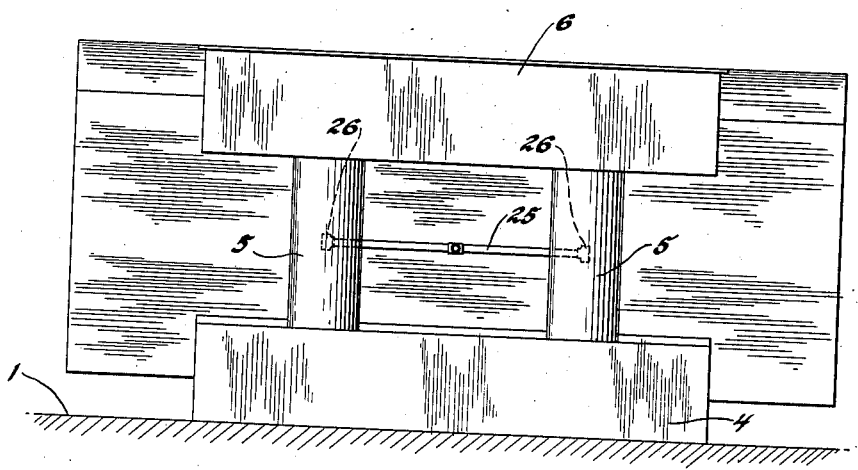

These and other objects and novel features of the invention will more fully appear from the description and the accompanying drawing in which, Fig. 1 is a view in elevation and partly in section showing the preferred embodiment of my invention, the air washing unit being on one side of the spraying compartment and provided with a passage under the compartment for causing a down draft to the air in the spraying compartment;

Fig. 2 is a view in end elevation, the pipes and pump being removed.

Referring to the drawing, the floor of a building is indicated at 1. In the embodiment of my invention illustrated in Figures 1 and 2, the spray room, hereinafter designated A, is provided with an independent floor 2, raised from the floor 1 and supported by other portions of the air cleaning unit hereinafter to be described.

In the illustration shown in Figs. 1 and 2, I place a water tank 3 upon the floor 1 and upon this tank the floor 2 is supported. At one end of the tank 3 I provide an enlarged air chamber 4 opening into the tank 3, and above the same and communicating therewith I mount two large hollow cylinders 5, preferably of circular bore, said cylinders opening into an eliminator chamber generally designated by the numeral 6.

The water eliminator 6 is formed with a plurality of vertically extending plates 7 so shaped as to change the direction of the flow of air many times as it passes therethrough.

The top of the eliminator is connected for communication with a pneumatic conveyor system comprising pipe or conduit 8 and exhaust fan 9 with the usual motor and exhaust outlet.

The spray booth is provided with the room A where the actual spraying is done, said room comprising side members 11 and 12, the latter being preferably curved to rest upon a portion of the floor 2 as shown in Fig. 1 and said sides support a roof 13. The other two sides of the booth are open to accommodate a conveyor passing therethrough with the object to be sprayed, or they may have a partial enclosure for that portion where the workman stands, such as the portion designated as 36.

In the preferred embodiment shown in Fig. 1 the roof 13 is provided with a circular grilled passage 14 and a suitable intake 15 is connected to said roof and adapted to guide air to the said grilled portion 14.

The roof portion 13 is preferably slanted near each side towards the side members 11 and 12 as shown at 16, in order to accommodate the usual lights used in such work.

The floor 2 is provided with a plurality of openings or a grilled portion 20 toward the side remote from the air chamber 4 and with a single opening 21 near the side adjacent to said air chamber 4.

A water pipe 22 is connected to the tank 3 and to a water pump 23 which forces water up through a pipe 24 thence through branch pipes 25, each branch pipe passing into a cylinder 5 and each branch pipe terminates in a double opposed nozzle 26, said nozzles being adapted to spray the water in conic form against the inner walls of the cylinders, discharging towards each end of each cylinder.

I claim:

1. A ventilated paint reclaiming spray booth having in combination a spray room having a roof, side walls, and floor, an air inlet for conducting air through said roof, a water reservoir under said floor, venting apertures in said floor spaced from the first one of said side walls for venting the spray room into said water reservoir, additional venting means in said floor adjacent the second one of the side walls, air circulating means, a conduit conductively connecting said air circulating means for drawing air from said water reservoir, and a double nozzle in said conduit for discharging a heavy spray of water across the entire cross-section of the conduit whereby all the air drawn from the water reservoir under the spray room must pass through said water spray.

2. A ventilated paint reclaiming spray booth having in combination a spray room including a roof, side walls, and floor, a water reservoir under said floor, venting apertures in said floor for venting the spray room into said water reservoir, air circulating means, a conduit conductively connecting said air circulating means for drawing air from said water reservoir whereby the paint spray is carried downwardly from the spray booth into the water reservoir, a double nozzle in said conduit for discharging a heavy spray of water across the entire cross-section of the conduit whereby all the air drawn from the water reservoir under the spray room must pass through said water spray, and means for supplying water to said double nozzle from said water reservoir whereby the water is reclaimed for depositing reclaimed material in said reservoir.

3. A ventilated paint reclaiming spray booth having in combination a roof, side walls and a floor enclosing a spray room, an air inlet for conducting air into the upper portion of said spray room, a water reservoir under said floor, venting apertures in the floor for venting the spray room into said water reservoir, air circulating means, a conduit connecting said air circulating means for drawing the air from said water reservoir, and a water spray nozzle in said conduit for discharging a heavy spray of water across said conduit whereby all the air which is drawn from the spray room down into the water reservoir under the spray room is thoroughly washed thereby as it is drawn through said conduit and the paint particles are collected in said reservoir.

4. In combination with a spraying booth, an enclosed chamber connected to said booth by a passage, said chamber presenting a liquid surface opposed to a jet passing from said booth through said passage and means for maintaining a vacuum in said chamber, and means for washing the air withdrawn from said chamber and returning the washed-out matter to said chamber.

JOHN E. LUDWIG.